United States Patent [19]
Dorton

[11] Patent Number: 5,722,631
[45] Date of Patent: Mar. 3, 1998

[54] SINGLE-PIECE MOUNT WITH SPLIT METAL PLATES

[75] Inventor: David W. Dorton, Erie, Pa.

[73] Assignee: Lord Corporation, Cary, N.C.

[21] Appl. No.: 529,118

[22] Filed: Sep. 15, 1995

[51] Int. Cl.⁶ ............................ F16M 13/00; F16F 7/00
[52] U.S. Cl. .................... 248/635; 248/632; 267/141; 267/141.4
[58] Field of Search ..................... 248/634, 635, 248/632, 633, 605, 606, 609, 638; 267/141, 141.3, 141.4, 141.6, 293

[56] References Cited

U.S. PATENT DOCUMENTS

| | | | |
|---|---|---|---|
| 1,855,769 | 4/1932 | Paton | 248/635 |
| 2,076,034 | 4/1937 | Lampman | 248/605 |
| 2,453,991 | 11/1948 | Kaemmerling | 267/141.6 |
| 3,139,250 | 6/1964 | Turlay | |
| 3,350,042 | 10/1967 | Stewart et al. | 267/141.4 |
| 4,186,930 | 2/1980 | Shulke | 248/634 X |
| 4,504,036 | 3/1985 | Passarell et al. | |
| 4,521,004 | 6/1985 | Caldwell | 267/141.4 |
| 4,744,539 | 5/1988 | Stimeling | |
| 5,295,652 | 3/1994 | Byrne | 248/635 |

*Primary Examiner*—Robert W. Gibson, Jr.
*Assistant Examiner*—Stephen S. Wentsler
*Attorney, Agent, or Firm*—Richard K. Thomson; Randall S. Wayland; James W. Wright

[57] ABSTRACT

A single-piece elastomeric mount installed over a plurality of openings has a like plurality of reinforcing plates to permit the elastomeric rib between the plates' edges to flex. The apertures in the mount can then be aligned with holes in a support having wider tolerances on their end positions. The mount may include two sets of plates: an upper load-distribution set and a lower wear-reducing set, each set being bonded to the elastomer.

16 Claims, 2 Drawing Sheets

SINGLE-PIECE MOUNT WITH SPLIT METAL PLATES

BACKGROUND AND SUMMARY OF THE INVENTION

This invention relates to the field of elastomeric mounts. More particularly, the present invention is directed to a mount having split plates which increase wear resistance while permitting flexing of the mount to permit variations in the support platte's hole spacing to be accommodated.

A concern arose regarding the wear life of a bushing mount being used to support a diesel truck engine. The mount is a cylindrical center-bonded bushing or grommet-style mount which was used in a ranged support that is formed as a casting. A small diameter portion of the mount (the "shank") extends through a hole formed in the support while a larger diameter portion (the "head") rests on the surface of the support. The lower surface of the head was experiencing considerable wear as a result of the vibration-induced movement between that surface and the rough cast surface of the support. In addition, test parts developed significant cracks at the transition point between the shank and the head. Further the upper surface of the head offered minimal surface area through which to react loads.

The present invention seeks to remedy whichever one of these problems is most serious for a particular application by extending the mount to reach between at least two holes in the supporting member and incorporating a metallic plate into the upper or lower surface to reduce wear. A problem arose when a single plate was provided that extended between the two holes: in forming the casting, dowel rods are used to position the grommet-receiving holes in the support. As the molten metal is poured into the casting, the dowel rods can be caused to move within a limited range of positions resulting in non-uniformity in the center hole spacing in the support. The lack of flexibility in the mount caused by the wear-reducing plate necessitated the customer to assume the additional expense of machining their part to provide a more uniform hole spacing or resulted in even greater additional costs associated with discarding out-of-spec castings.

To resolve this problem, the flexibility of the present mount is enhanced by subdividing the reinforcement plate (s), with each fastener-receiving aperture being provided with its own wear-reducing and/or load distributing plate. The elastomer between the surface plates serves as a flexible spine or rib enabling the center-to-center spacing of the apertures to be flexed to accommodate the out-of-spec hole spacing in the support. The upper load-distributing plates significantly increase the surface area which engages the supported member thereby more widely distributing the load. For this particular application, it is preferred that each aperture be provided with a set of both upper load-distributive plates and a set of lower wear-reducing plates, but some applications may require only one of these sets of plates.

Various other features, advantages and characteristics of the present invention will become apparent after a reading of the following specification.

BRIEF DESCRIPTION OF THE DRAWINGS

The drawings depict the preferred embodiments of the present invention, like items bearing like reference numerals in which.

DETAILED DESCRIPTION OF THE PREFERRED EMBODIMENTS

Figure 1:
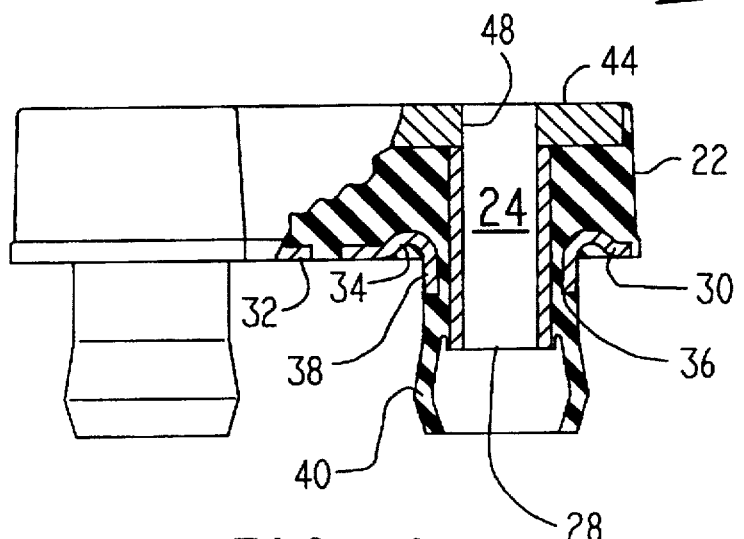
FIG. 1 is side view in partial cross section of a first embodiment of the elastomeric mount of the present invention.

A first embodiment of the elastomeric mount of the present invention is depicted in FIG. 1 generally at 20. A first fastener-receiving aperture 24 extends through an elastomeric layer 22 and is preferably lined by a center-bonded metallic sleeve 28. A second fastener receiving aperture 26 also extends through the elastomeric layer 22 and is lined by a second sleeve (not shown). Although the mount 20 of this design is shown as a grommet-type mount having center-bonded sleeves 28, the principles of this invention apply to other types of mounts, as well.

Figure 2A:
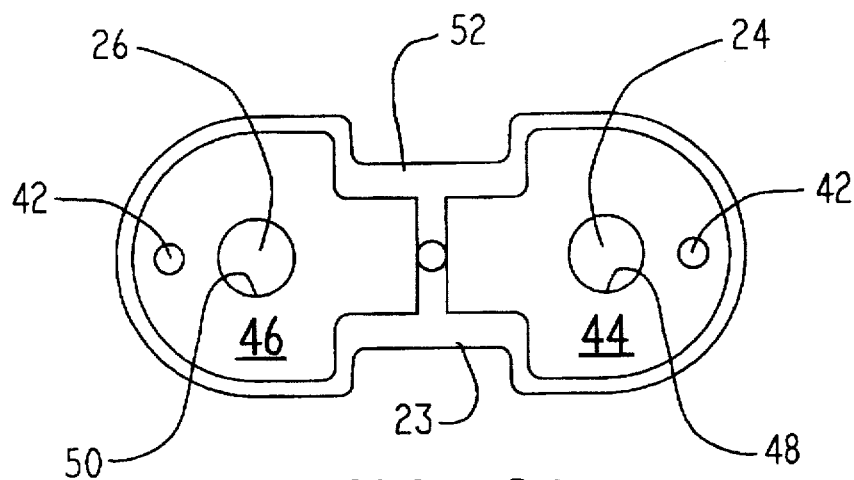
FIG. 2A is a top view of the embodiment depicted in FIG. 1.
Figure 2B:
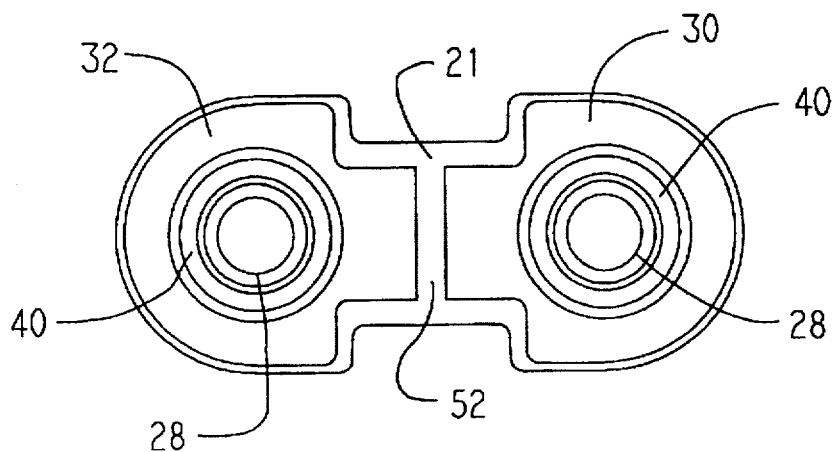
FIG. 2B is a bottom view of the FIG. 1 embodiment.

A first set of metallic plates 30, 32 (FIG. 2B) are bonded to a lower surface 21 of elastomeric layer 22 and, indeed, the elastomer may be permitted to fill the recess 34 created when central throughbore 36 is formed by extruding collar 38. An elastomeric boot 40 is formed by elastomer extruded between sleeves 28 and collar 38 for a purpose to be described below.

Upper plates 44 and 46 (FIG. 2A) are bonded to the upper surface 23 of elastomeric layer 22 and have apertures 48 and 50 which are coaxial with apertures 24 and 26, respectively. Upper plates 44 and 46 are formed with sprue holes 42 to permit the elastomer of layer 22 to be injected into the mold (not shown) therethrough. A rib of elastomer 52 is formed between the ends of the first set of plates 30, 32 and the second set of plates 44, 46. Rib 52 permits the mount to be flexed to permit center-bonded apertures 24, 26 to accommodate variations in center-to-center spacing of holes 15 in support 13. The terminal ends of pairs of plates 30 and 44 and 32 and 46 are shown as being coplanar which is preferred, although not necessary.

Figure 3:
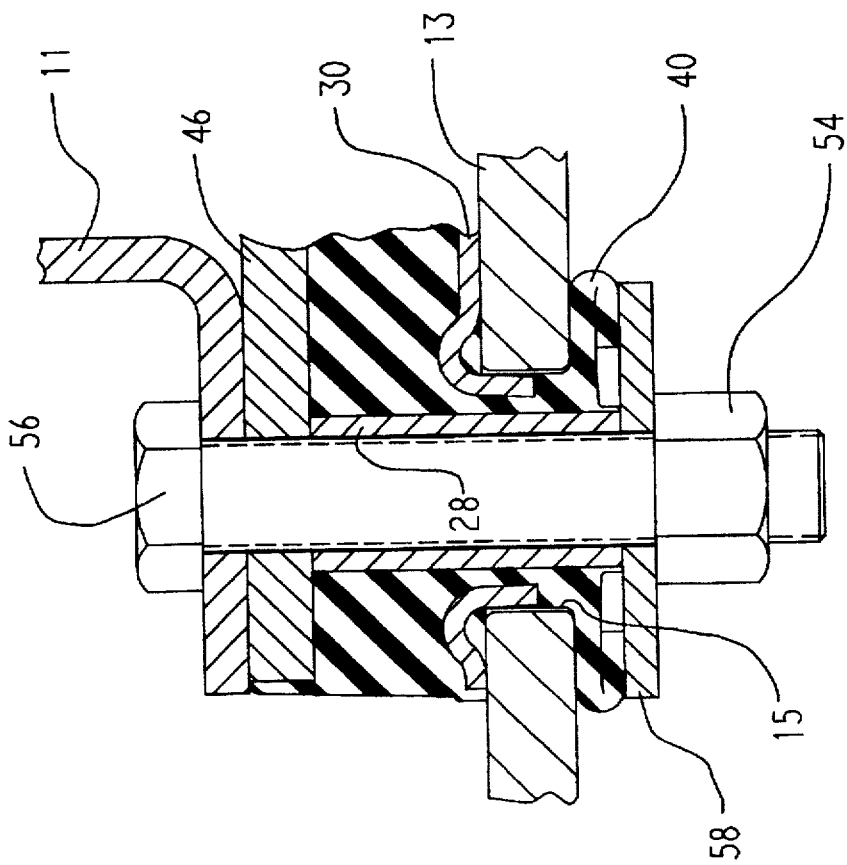
FIG. 3 is a cross-sectional side view of a portion of the mount of the present invention shown in its installed position.

As best seen in FIG. 3, nut 54 is threaded onto end of bolt 56 to secure supported member 11 to support 13. Support 13 is a rough finished cast member and plates 30, 32 of the first set of plates will protect elastomeric layer 22 from abrasion caused by rubbing as the supported member, a diesel engine, for example, vibrates relative t6 support 13. The supported member 11 (which may for example be an engine bracket), upper plates 44, 46, sleeves 28, and washer 58 provide a solid metallic path between the head of bolt 56 and nut 54 permitting the elastomer of boot 40 to be collapsed as shown in FIG. 3. Normally, as mount 20 receives its half of the diesel engine load (or 1300 lbs. each, two mounts 20 being used), the design of the mount will be such that a slight gap will open between boot 40 and the nether surface of support 13. This gap will enhance vibrational isolation. In any case, boot 40 serves as a rebound cushion damping upward movement of the supported member 11 which may be caused by engine torque or road bumps, for example.

The present mount was tested in a test fixture against the grommet-style mount it replaced until each mount was worn out (defined as a 30% reduction in stiffness). The mount of the present invention achieved more than an 8 fold increase in wear life (221,000 cycles vs. 25,000 cycles). In addition, reduced wear on the underhead portion of the mount was experienced as a result of the presence of plates 30, 32 in spite of the additional cycles.

Figure 4:
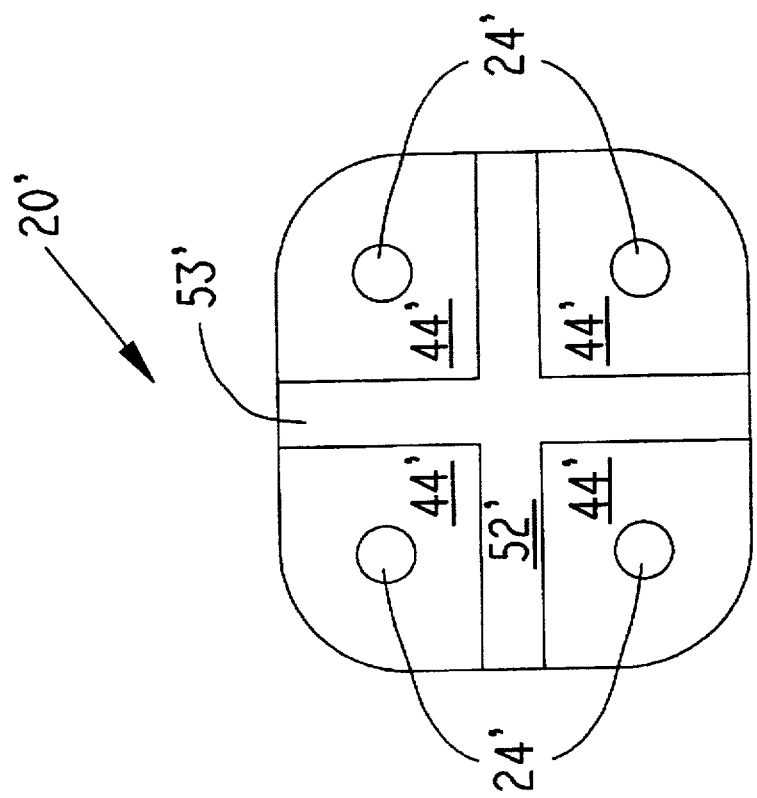
FIG. 4 is a top view of a second embodiment of the present invention.

The advantages of the present mount design are not limited to application to bushing type mounts nor to mounts having only two throughbores. A second embodiment is depicted in FIG. 4 in which mount 20' is shown having four fastener-receiving apertures 24' each having its separate plate 44'. The horizontal and vertical ribs 52' and 53' permit the alignment of apertures 24' to be varied to permit the mount 20' to accommodate variations in center to center spacing of apertures 15 in support 13. Obviously, the configuration shown is exemplary and not intended to be limiting in any sense.

Various changes, alternatives and modifications will become apparent to one of ordinary skill in the art following a reading of the foregoing specification. It is intended that all such changes, alternatives and modifications as fall within the scope of the appended claims be considered part of the present invention.

What is claimed is:

1. An elastomeric mount comprising
   a) a layer of elastomer;
   b) at least two fastener-receiving apertures extending through said elastomeric mount;
   c) at least two separate substantially coplanar metallic plates, one for each of said at least two fastener-receiving apertures adjacent a lower surface of said layer of elastomer forming a first set of metallic plates to provide a wear-protecting, load-distributing surface for said elastomer, each of said at least two plates of said first set having an aperture which is coaxial with its corresponding fastener-receiving aperture in said mount, said fastener-receiving aperture being surrounded by a collar which has been extruded from each of said at least two plates, and each of said plates being bonded to said adjacent surface of said layer of elastomer, each of said at least two plates having an end portion juxtaposed to an end portion of each of said other at least two plate, said juxtaposed end portions forming pairs of end portions, said elastomer forming a narrow rib between each of said pairs of end portions;
   whereby said narrow rib between each of said pairs of end portions of said at least two separate metallic plates permits flexing of said elastomeric mount enabling a distance between said at least two fastener-receiving apertures to be adjusted to accommodate variations in hole center spacing in a supporting member to which said mount is attached.

2. The elastomeric mount of claim 1 further comprising a second set of separate metallic plates equal in number to said at least two fastener-receiving apertures having apertures coaxial with each of said fastener-receiving apertures in said mount, said second set of plates being positioned adjacent said upper surface of said elastomer to distribute load.

3. The elastomeric mount of claim 1 wherein said collar of each of said at least two plates forms a recess with said plate and each of said recesses is at least partially filled by said layer of elastomer.

4. The elastomeric mount of claim 3 wherein each fastener-receiving aperture in said mount is lined by a metallic sleeve extending therethrough.

5. The elastomeric mount of claim 4 wherein said at least two metallic plates of said first set positioned adjacent said lower surface of said elastomer are each formed as separate stampings, said extruded collar non-engagingly receiving one of said metallic sleeves.

6. The elastomeric mount of claim 5 further comprising a deformable elastomeric boot surrounding and extending beyond said metallic sleeve, said elastomeric boot being deformable to form a rebound cushion.

7. The elastomeric mount of claim 6 wherein a thickness of said plate from said second set and said metallic sleeve form a fixed distance between an underneath surface of a bolt head and an opposing surface of a connected nut.

8. The elastomeric mount of claim 7 wherein said fixed distance between an underneath surface of a bolt head and an opposing surface of a connected nut is generally equal to a thickness normally occupied by a supported member, said elastomeric mount, said supporting member, said elastomeric boot in a fully compressed position, and washer means against which said connected nut seats, whereby said elastomeric boot operates as a rebound cushion against an upward movement of said supported member relative to said supporting member.

9. An elastomeric mount comprising
   a) a layer of elastomer;
   b) at least two fastener-receiving apertures extending through said elastomeric mount, each of said fastener-receiving apertures being lined by a metallic sleeve;
   c) at least two separate substantially coplanar metallic plates, one for each of said at least two fastener-receiving apertures adjacent an upper or lower surface of said layer of elastomer forming a first set of metallic plates to provide a wear-protecting, load-distributing surface for said elastomer, each of said at least two plates of said first set having an aperture which is coaxial with its corresponding fastener-receiving aperture in said mount and each of said plates being bonded to said adjacent surface of said layer of elastomer, each of said at least two plates having an end portion juxtaposed to an end portion of each of said other at least two plates, said juxtaposed end portions forming pairs of end portions, said elastomer forming a narrow rib between each of said pairs of end portions;
   d) a deformable elastomeric boot surrounding and extending beyond said metallic sleeve, said elastomeric boot being deformable to form a rebound cushion;
   whereby said narrow rib between each of said pairs of end portions of said at least two separate metallic plates permits flexing of said elastomeric mount enabling a distance between said at least two fastener-receiving apertures to be adjusted to accommodate variations in hole center spacing in a supporting member to which said mount is attached.

10. The elastomeric mount of claim 9 wherein each of said metallic sleeves defines a first fixed distance, said first fixed distance being generally equal to a second distance normally occupied by a combination of i) said layer of elastomer, ii) said supporting member, and iii) said elastomeric boot in a fully compressed position, whereby said elastomeric boot operates as a rebound cushion against an upward movement of said supported member relative to said supporting member.

11. The elastomeric mount of claim 9 wherein said first set of metallic plates are positioned adjacent and bonded to said upper surface of said elastomer to distribute load.

12. An elastomeric mount comprising
   a) a layer of elastomer;
   b) at least two fastener-receiving apertures extending through said elastomeric mount;
   c) at least two separate substantially coplanar metallic plates, one for each of said at least two fastener-receiving apertures adjacent an upper or lower surface of said layer of elastomer forming a first set of metallic plates to provide a wear-protecting, load-distributing surface for said elastomer, each of said at least two plates of said first set having an aperture which is coaxial with its corresponding fastener-receiving aperture in said mount and each of said plates being bonded to said adjacent surface of said layer of elastomer, said at least two separate metallic plates of said first set positioned adjacent said upper or lower surface of said elastomer are each formed as separate stampings having a central throughbore formed by an extruded collar, each of said at least two extruded collars receiving a metallic sleeve;

whereby said at least two separate metallic plates permit flexing of said elastomeric mount enabling a distance between said at least two fastener-receiving apertures to be adjusted to accommodate variations in hole center spacing in a supporting member to which said mount is attached.

13. The elastomeric mount of claim 12 further comprising a deform able elastomeric boot surrounding and extending beyond said metallic sleeve, said elastomeric boot being deform able to form a rebound cushion.

14. The elastomeric mount of claim 12 an overall length of one of said metallic sleeves defines a first fixed distance.

15. The elastomeric mount of claim 14 wherein said first fixed distance is generally equal to a second distance normally occupied by a combination of i) said layer of elastomer, ii) said supporting member, and iii) said elastomeric boot in a fully compressed position, whereby said elastomeric boot operates as a rebound cushion against an upward movement of said supported member relative to said supporting member.

16. The elastomeric mount of claim 12 wherein said first set of metallic plates are positioned adjacent and bonded to said upper surface of said elastomer to distribute load.

* * * * *